United States Patent
Yokoe et al.

(10) Patent No.: US 10,670,863 B2
(45) Date of Patent: Jun. 2, 2020

(54) HEAD-UP DISPLAY DEVICE WITH REFLECTIVE OPTICAL SYSTEM FOR VEHICLE

(71) Applicant: DENSO CORPORATION, Kariya, Aichi-pref. (JP)

(72) Inventors: Junya Yokoe, Kariya (JP); Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 40 days.

(21) Appl. No.: 15/743,938

(22) PCT Filed: Aug. 8, 2016

(86) PCT No.: PCT/JP2016/073239
§ 371 (c)(1),
(2) Date: Jan. 11, 2018

(87) PCT Pub. No.: WO2017/033719
PCT Pub. Date: Mar. 2, 2017

(65) Prior Publication Data
US 2018/0210199 A1    Jul. 26, 2018

Related U.S. Application Data

(63) Continuation of application No. PCT/JP2016/073239, filed on Aug. 8, 2016.

(30) Foreign Application Priority Data

Aug. 26, 2015 (JP) .................................. 2015-166958

(51) Int. Cl.
*G02B 27/01* (2006.01)
*B60K 35/00* (2006.01)
(Continued)

(52) U.S. Cl.
CPC .......... *G02B 27/0101* (2013.01); *B60K 35/00* (2013.01); *B60K 37/00* (2013.01);
(Continued)

(58) Field of Classification Search
CPC ........ B60K 2370/1529; B60K 2370/27; B60K 2370/334
See application file for complete search history.

(56) References Cited

U.S. PATENT DOCUMENTS

| 2006/0018119 A1* | 1/2006 | Sugikawa | ................. G02B 5/26 |
| | | | 362/231 |
| 2007/0018907 A1* | 1/2007 | Koma | ................. G02B 27/0101 |
| | | | 345/7 |

(Continued)

FOREIGN PATENT DOCUMENTS

| JP | 2007-052383 A | 3/2007 |
| JP | 2008-242332 A | 10/2008 |

(Continued)

*Primary Examiner* — Chun-Nan Lin
(74) *Attorney, Agent, or Firm* — Harness, Dickey & Pierce, P.L.C.

(57) ABSTRACT

A head-up display device includes an illumination optical system, an imaging optical system and a reflective optical system. The illumination optical system emits a source light indicating information. The imaging optical system projects the source light to a projection surface. The reflective optical system has a dielectric multilayer film, and is configured so that a retardation of a subject wavelength including at least a part of wavelengths of the source light from the illumination optical system is in a range greater than −π/2 [rad] and smaller than π/2 [rad]. The reflective optical system is arranged on a path from the illumination optical system to the imaging system so that a polarization axis of the source light from the illumination optical system defines an angle α

(Continued)

satisfying a relation of 0 degree $<\alpha<90$ degrees $<\alpha<180$ degrees, relative to an incident surface.

10 Claims, 5 Drawing Sheets

(51) Int. Cl.
    *B60K 37/00*     (2006.01)
    *G02B 5/20*     (2006.01)
    *G02B 5/30*     (2006.01)
    *B60K 37/02*     (2006.01)

(52) U.S. Cl.
    CPC .............. *B60K 37/02* (2013.01); *G02B 5/208* (2013.01); *G02B 5/30* (2013.01); *B60K 2370/1529* (2019.05); *B60K 2370/27* (2019.05); *B60K 2370/334* (2019.05)

(56) References Cited

U.S. PATENT DOCUMENTS

| | | | | |
|---|---|---|---|---|
| 2008/0247044 | A1* | 10/2008 | Kuwabara | G02B 5/0833 359/580 |
| 2014/0184996 | A1 | 7/2014 | Matsushita et al. | |
| 2016/0018645 | A1* | 1/2016 | Haddick | G06T 19/006 345/8 |
| 2016/0062121 | A1* | 3/2016 | Border | G02B 27/0172 359/630 |

FOREIGN PATENT DOCUMENTS

| | | |
|---|---|---|
| JP | 2013057897 A | 3/2013 |
| JP | 2013174855 A | 9/2013 |
| JP | 2014191321 A | 10/2014 |
| JP | 2014238477 A | 12/2014 |
| JP | 2015-007763 A | 1/2015 |
| WO | WO-2016203732 A1 | 12/2016 |

* cited by examiner

HEAD-UP DISPLAY DEVICE WITH REFLECTIVE OPTICAL SYSTEM FOR VEHICLE

CROSS REFERENCE TO RELATED APPLICATIONS

This application is a U.S. National Phase Application under 35 U.S.C. 371 of International Application No. PCT/JP2016/073239 filed on Aug. 8, 2016 and published in Japanese as WO 2017/033719 A1 on Mar. 2, 2017. This application is based on and claims the benefit of priority from Japanese Patent Application No. 2015-166958 filed on Aug. 26, 2015. The entire disclosures of all of the above applications are incorporated herein by reference.

TECHNICAL FIELD

The present disclosure relates to a head-up display device that is to be mounted in a movable body and a reflective optical system that is to be used in a head-up display device.

BACKGROUND ART

There has been known a head-up display device (hereinafter referred to as the "HUD") that is mounted in a movable body (See Patent Literature 1). The HUD includes a display unit that emits a source light for indicating information, and an imaging optical system that projects the source light emitted from the display unit onto a projection surface of the movable body to thereby display the source light as a virtual image.

PRIOR ART LITERATURE

Patent Literature

Patent Literature 1: JP2014-191321A

SUMMARY OF INVENTION

In an HUD, infrared rays contained in an external sunlight are likely to enter a display unit, and thus the display unit is likely to be damaged due to heat.

In order to reduce the damage to the display unit by the sunlight, it is considered to arrange a reflective optical system on a path of the source light from the display unit to an imaging optical system in the HUD. In this case, the reflective optical system is a cold mirror having a dielectric multilayer film that transmits light in an infrared region and reflects light in a visible light region.

However, the dielectric multilayer film of the cold mirror is made of a stack of thin films having different indexes of refraction. Therefore, when the source light from the display unit is reflected on the cold mirror, a retardation occurs between s-wave and p-wave, resulting in elliptical polarization.

When the elliptically polarized source light is projected on a projection surface of an imaging optical system that has different reflectances depending on wavelengths, the chromaticity is likely to be changed relative to the source light emitted from the display unit.

Namely, in a conventional art, it was difficult to suppress the change of chromaticity while reducing damage to the display unit by the sunlight.

As an aspect of the present disclosure, it is an objective to provide a head-up display device and a reflective optical system used for the head-up display device, which are capable of suppressing the change in chromaticity while reducing damage to a display unit by the sunlight.

An embodiment of the present disclosure relates to a head-up display device to be mounted in a movable body. The head-up display device includes an illumination optical system, an imaging optical system and a reflective optical system.

The illumination optical system emits a source light indicating information. The imaging optical system is configured to project the source light emitted from the illumination optical system onto a projection surface.

The reflective optical system includes a dielectric multilayer film that transmits an electromagnetic wave in an infrared region and reflects an electromagnetic wave in a visible light region. The reflective optical system is arranged on a path of the source light from the illumination optical system to the imaging optical system in such a manner that a polarization axis of the illumination optical system relative to an incident surface of the reflective optical system is in a range greater than 0 degree and less than 90 degrees or in a range greater than 90 degrees and less than 180 degrees.

In the head-up display device, the reflective optical system is arranged on the path of the source light from the illumination optical system to the imaging optical system. Therefore, the head-up display device can restrict infrared rays contained in the sunlight externally applied to the head-up display device from reaching the illumination optical system, and thus restricts the display unit from being damaged by the sunlight.

In addition, the reflective optical system is configured that a retardation of a subject wavelength including at least a part of wavelengths of the source light from the illumination optical system is in a range greater than $-\pi/2$ [rad] and smaller than $\pi/2$ [rad].

This configuration is based on the inventors finding, which has been obtained by their diligent studying, of that chromatic dispersion of the source light reflected by the imaging system can be suppressed when the retardation of the subject wavelength is in the range greater than $-\pi/2$ [rad] and smaller than $\pi/2$ [rad].

That is, the head-up display device can suppress the change of chromaticity in the light projected to the imaging optical system.

In other words, the head-up display device can suppress the change of chromaticity of the source light projected to the imaging optical system while reducing the damage to the display unit by the sunlight.

A second embodiment of the present disclosure may relate to a reflective optical system used for a head-up display device.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Hereinafter, an embodiment of the present disclosure will be described with reference to the drawings.

<Head-Up Display Device>

Figure 1:
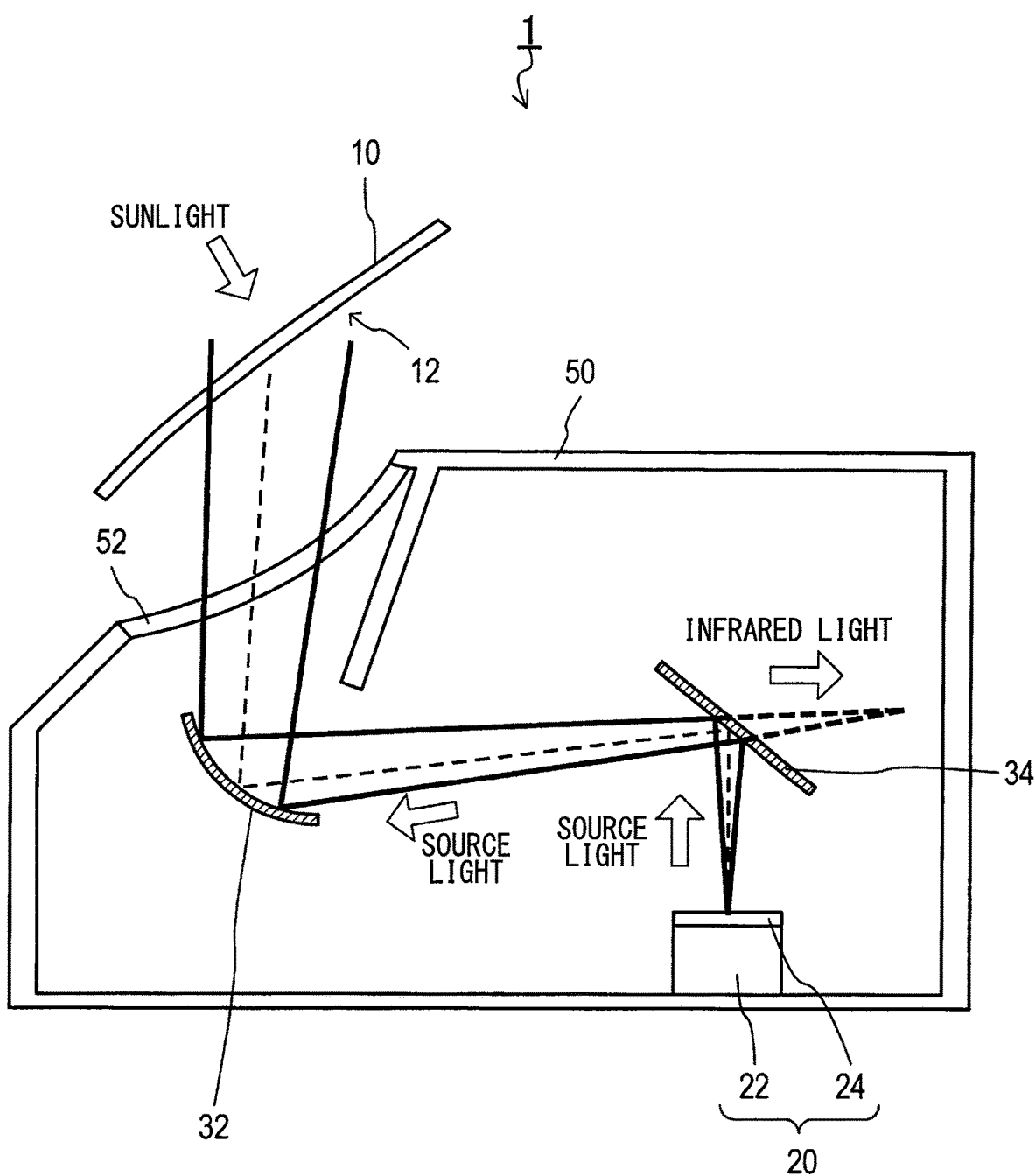
FIG. 1 is an explanatory diagram illustrating a schematic structure of a head-up display device.

A head-up display device 1 shown in FIG. 1 is a device that is to be mounted in an automobile as a movable body. Hereinafter, the head-up display device 1 is referred to as HUD 1.

The HUD 1 includes an imaging optical system 10, a light emitting unit 20, a concave mirror 32, a reflective optical system 34 and a casing 50.

The imaging optical system 10 is made of a member having a projection surface 12 onto which information is projected. The imaging optical system 10 projects a source light projected by the light emitting unit 20 as a virtual image. In the present embodiment, the imaging optical system 10 is a windshield of a vehicle. An interior surface of the windshield facing an interior of a passenger compartment serves as the projection surface 12. The projection surface 12 has different reflectances depending on wavelengths.

The imaging optical system 10 is not limited to the windshield, but may be a transparent screen (i.e., combiner) that is disposed more close to a driver's seat than the windshield.

The HUD 1 is a display device that shows information so that a driver can visually recognize the information during driving (i.e., a display device for a driver). The HUD 1 displays an image to overlap with a scenery (driver's front view) outside of the vehicle that can be visually recognized by the driver through a portion of the windshield (front glass) in front of the driver. The image displayed by the HUD 1 can be visually recognized on a virtual image plane that is located further forward than the windshield.

The casing 50 is a case accommodating the light emitting unit 20, the concave mirror 32, and the reflective optical system 34 therein. The casing 50 accommodating the light emitting unit 20, the convex mirror 32 and the reflective optical system 34 is arranged inside of a dashboard of an automobile.

The casing 50 has an opening at a position on a path of the source light so as to allow the source light emitted from the light emitting unit 20 to reach the imaging optical system 10. Further, a dust-proof cover 52 is attached to the casing 50 to cover the opening.

The light emitting unit 20 includes an illumination optical system 22 and a wavelength plate 24.

The illumination optical system 22 is a device that emits a source light indicating various information to be visually recognized by the driver. In the present embodiment, the illumination optical system 22 is a known liquid crystal display, which emits a source light that has been linearly polarized while transmitting through a liquid crystal panel, a color filter and a polarization filter.

In this case, the linear polarization means polarization by which lights are polarized to states having polarization axes in the same direction in all liquid crystal pixels. Also, the same direction means that a difference of angle between the polarization axes of the respective liquid crystal pixels is "0" or in an allowable range that can be regarded as "0".

The source light is a light that represents information to be visually recognized by a driver. The source light is a light emitted by a backlight and linearly polarized.

The wavelength plate 23 is arranged on a path of the source light from the illumination optical system 22 to the reflective optical system 34. The wavelength plate 24 is a known member that generates retardation in orthogonal polarization components of the source light emitted from the illumination optical system 22. In the present embodiment, the orthogonal polarization components are s-wave and p-wave.

The wavelength plate 24 is determined so that a polarization axis of the source light emitted from the illumination optical system 22 defines an angle of greater than 0 degree and less than 90 degrees, or greater than 90 degrees and less than 180 degrees, relative to an incident surface of the reflective optical system 34.

The concave mirror 32 is a known optical member that focus parallel incident light to a focal point. The concave mirror 32 is arranged on an optical path from the reflective optical system 34 to the imaging optical system 10 so as to reflect and direct the source light to the imaging optical system 10.

<Reflective Optical System>

The reflective optical system 34 is an optical member, so-called a cold mirror, which has a dielectric multilayer film that transmits electromagnetic waves in an infrared region and reflects electromagnetic waves in a visible light region. The dielectric multilayer film of the reflective optical system 34 is made by alternately stacking dielectric films having different indexes of refraction.

In this case, the infrared region is a region of wavelength that is longer than red of the visible light and shorter than an electrical wave. An example of the infrared region is a wavelength region from 750 [nm] to 1000 [μm]. Also, the visible light region is a region of wavelength that is longer than a wavelength of an ultraviolet light and shorter than a wavelength of the infrared ray. An example of the visible light region is a wavelength region from 350 [nm] to 750 [nm].

The dielectric multilayer film of the reflective optical system 34 is configured so that a retardation of a subject wavelength is in a range greater than $-\pi/2$ [rad] and less than $\pi/2$ [rad]. In the present disclosure, the subject wavelength is a single wavelength or a wavelength region including at least a part of wavelengths of the source light from the illumination optical system 22. The retardation of the subject wavelength is a retardation between orthogonal polarization components of the subject wavelength (i.e., s-wave and p-wave).

As an example of implementing the reflective optical system 34 in which the retardation of the subject wavelength is in the range greater than $-\pi/2$ [rad] and less than $\pi/2$ [rad], it is considered to adjust the thickness of at least one film of the dielectric multilayer film, or to adjust the entire thickness of the dielectric multilayer film. As an example of implementing the reflective optical system 34 in which the retardation of the subject wavelength is in the range greater than $-\pi/2$ [rad] and less than $\pi/2$ [rad], it is considered to adjust the thickness of each film of the dielectric multilayer having different indexes of refraction, or to adjust the material of films forming the dielectric multilayer film. In this case, the adjustment includes determination of optimal solution by experiments or simulations.

In the present embodiment, the subject wavelength is a wavelength region including wavelength regions of red, blue and green in a spectrum of the source light incident from the illumination optical system 22. Specifically, a wavelength region λc of the subject wavelength of the present embodiment can be calculated by the following equation (1).

[Equation 1]

$$\frac{\int_{\lambda_C} L(\lambda_T) \cdot (X(\lambda_T) + Y(\lambda_T) + Z(\lambda_T)) d\lambda}{\int_{\lambda_{all}} L(\lambda_T) \cdot (X(\lambda_T) + Y(\lambda_T) + Z(\lambda_T)) d\lambda} = I_{Th} \quad (1)$$

Figure 2:
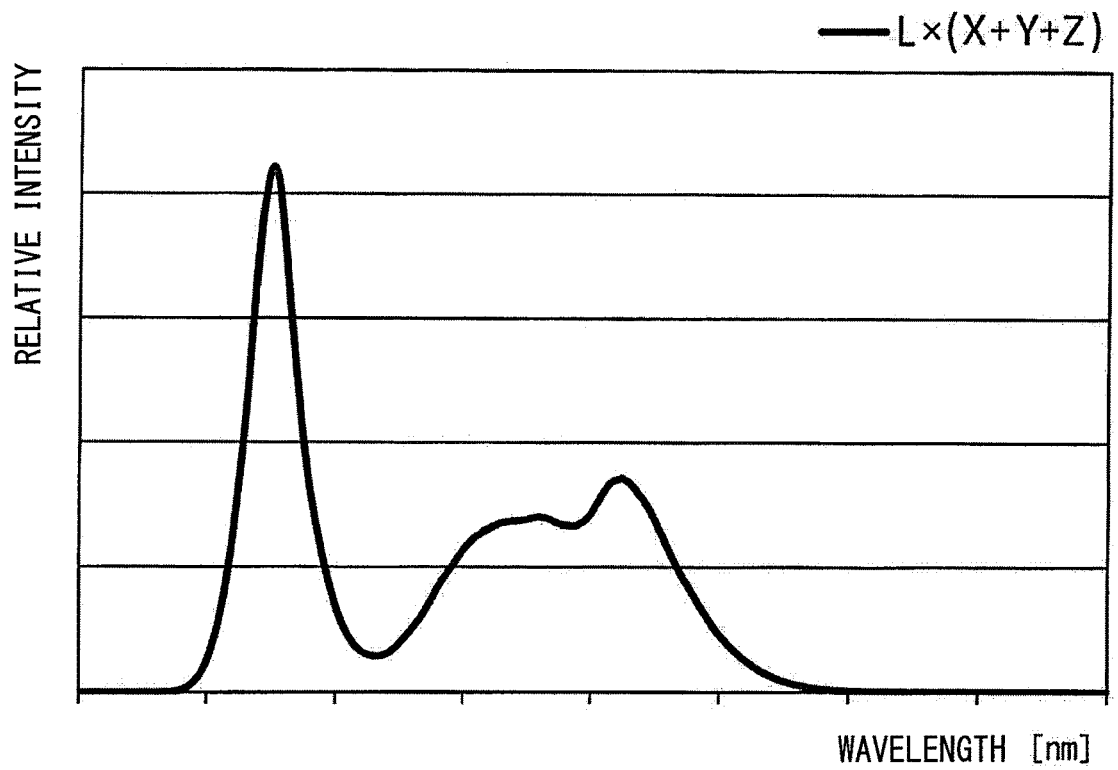
FIG. 2 is a graph illustrating an evaluation spectrum for explaining a method of determining a characteristic of a reflective optical system.
Figure 3:
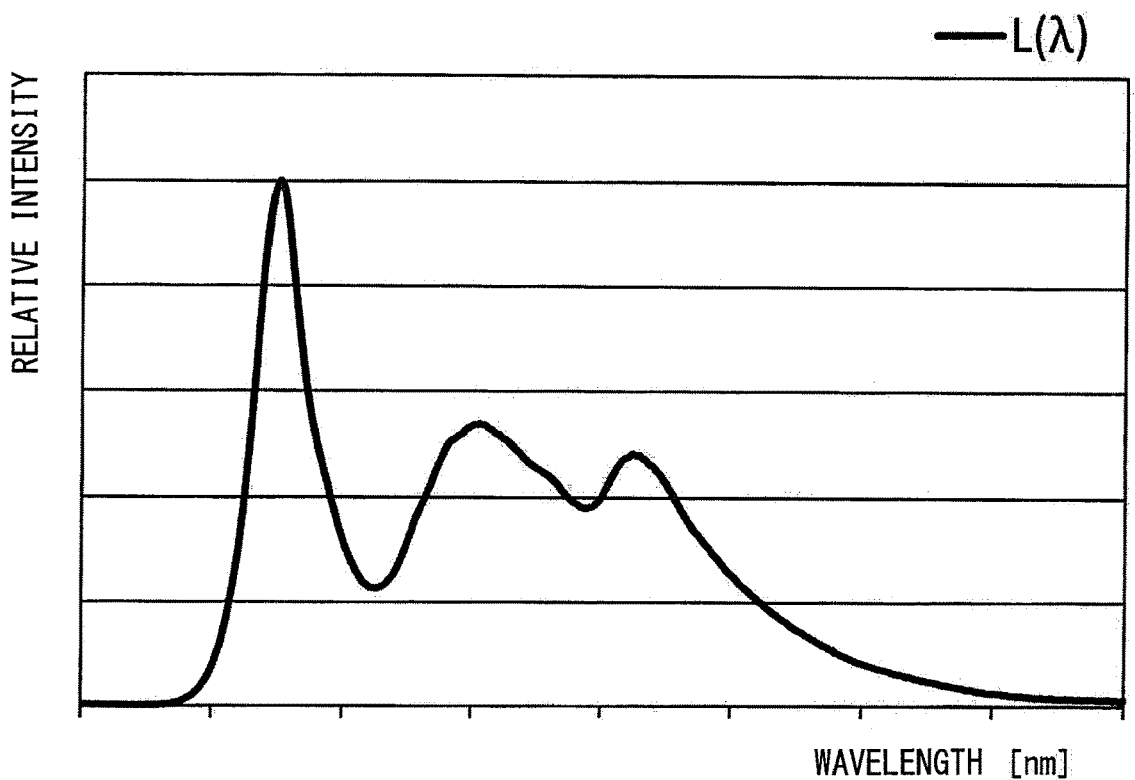
FIG. 3 is a graph illustrating a spectrum of a light source emitted from backlight for explaining the method of determining the characteristic of the reflective optical system.

In the equation 1, λall is an entire wavelength region in an evaluation spectrum as shown in FIG. 2. That is, a denominator of the equation (1) (hereinafter also referred to as "intensity sum") is the sum of spectrum intensity in the evaluation spectrum.

Figure 4:
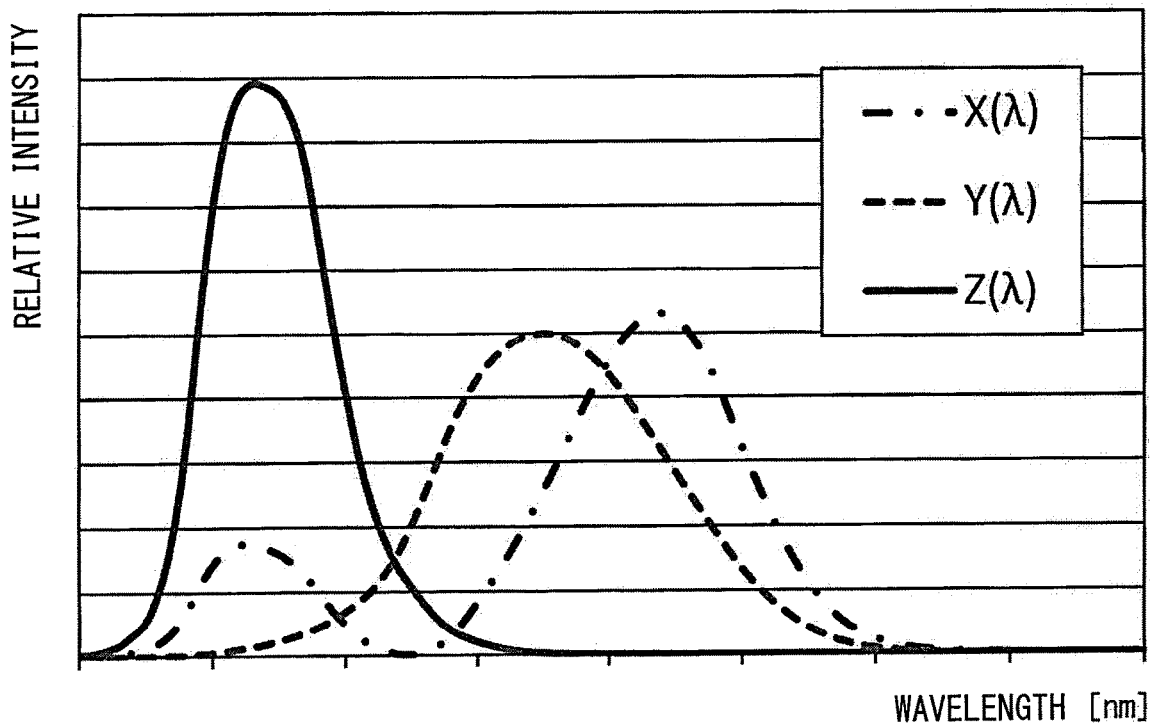
FIG. 4 is a graph illustrating CIE XYZ color-matching functions for explaining the method of determining the characteristic of the reflective optical system.

The evaluation spectrum is a spectrum obtained by multiplying a light spectrum L(λ) of a light from the backlight by color-matching functions X(λ), Y(λ) and Z(λ) as shown in FIG. 4. In this case, the color-matching functions are known CIE XYZ color-matching functions.

In the equation (1), the wavelength region λc is a set of wavelengths $\lambda_T$ satisfying the following equation (2).

$$L(\lambda_T) \cdot (X(\lambda_T) + Y(\lambda_T) + Z(\lambda_T)) > I_T \quad [\text{Equation 2}]$$

It is to be noted that, in the equation (2), a symbol $I_T$ is a preset threshold that is defined in advance as a threshold of relative intensity of spectrum.

That is, in the evaluation spectrum of the present embodiment, the wavelength region λc of the subject wavelength can be the wavelength region made of a set of spectrums whose relative threshold is greater than the threshold $I_T$ and whose rate of the spectrum intensity relative to the intensity sum of the evaluation spectrum is greater than the preset value $I_{th}$. Note that the preset value $I_{th}$ is a threshold that is determined in advance by experiments or simulations.

Figure 5:
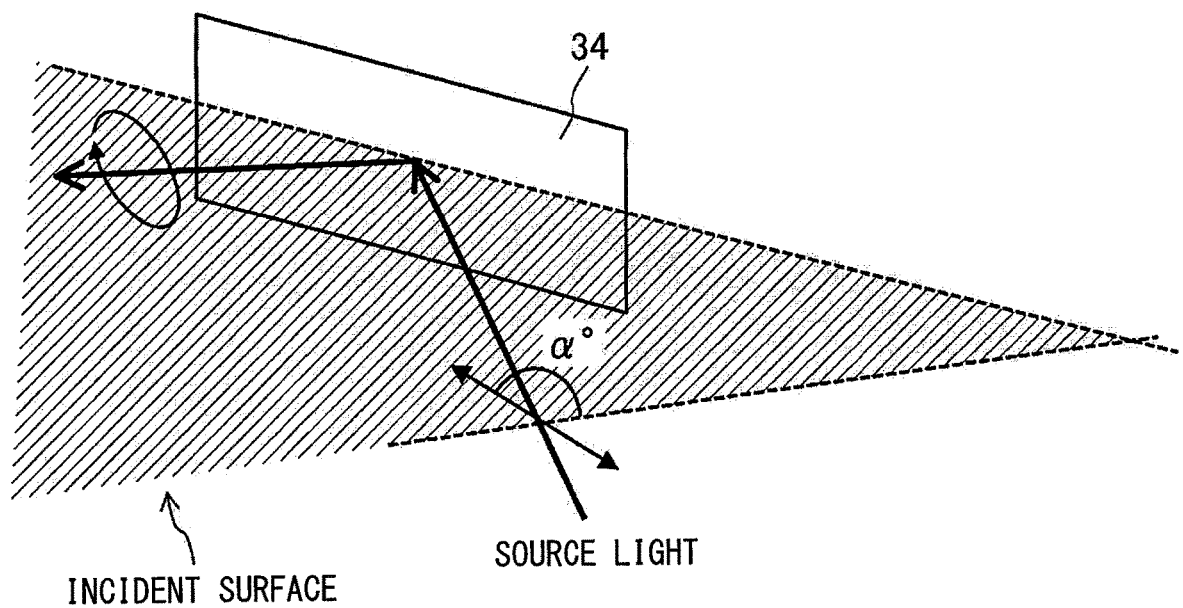
FIG. 5 is an explanatory diagram for explaining a positional relationship between an illumination optical system and a reflective optical system.

The reflective optical system 34 is arranged on the path of the source light from the illumination optical system 22 to the imaging optical system 10. As shown in FIG. 5, the reflective optical system 34 is arranged such that the polarization axis of the source light having passed through the wavelength plate 24 defines an angle (a in FIG. 5), relative to the incident surface, being greater than 0 degree and less than 90 degrees, or greater than 90 degrees and less than 180 degrees. That is, the reflective optical system 34 is arranged so that the angle α of the polarization axis of the source light satisfies a relation of 0 degree <α<90 degrees <α<180 degrees, relative to the incident surface.

Advantageous Effects of the Present Embodiment

In the head-up display device 1, as described above, the reflective optical system 34 is arranged on the path of the source light from the illumination optical system 22 to the imaging optical system 10.

The infrared rays contained in the external sunlight pass through the reflective optical system 34 without being reflected by the reflective optical system 34. Therefore, the head-up display device 1 can restrict the infrared rays contained in the sunlight from reaching the illumination optical system 22, and thus damage to the illumination optical system 22 due to the infrared rays of the sunlight can be reduced.

In the head-up display device 1, the reflective optical system 34 is configured so that the retardation of the subject wavelength of the source light emitted from the illumination optical system 22 is in the range greater than −π/2 [rad] and smaller than π/2 [rad].

This configuration is based on the inventors finding, obtained as a results of their diligent studying, that the wavelength dispersion of the source light reflected by the imaging optical system 10 can be reduced when the retardation of the subject wavelength is in the range greater than −π/2 [rad] and smaller than π/2 [rad].

Figure 6:
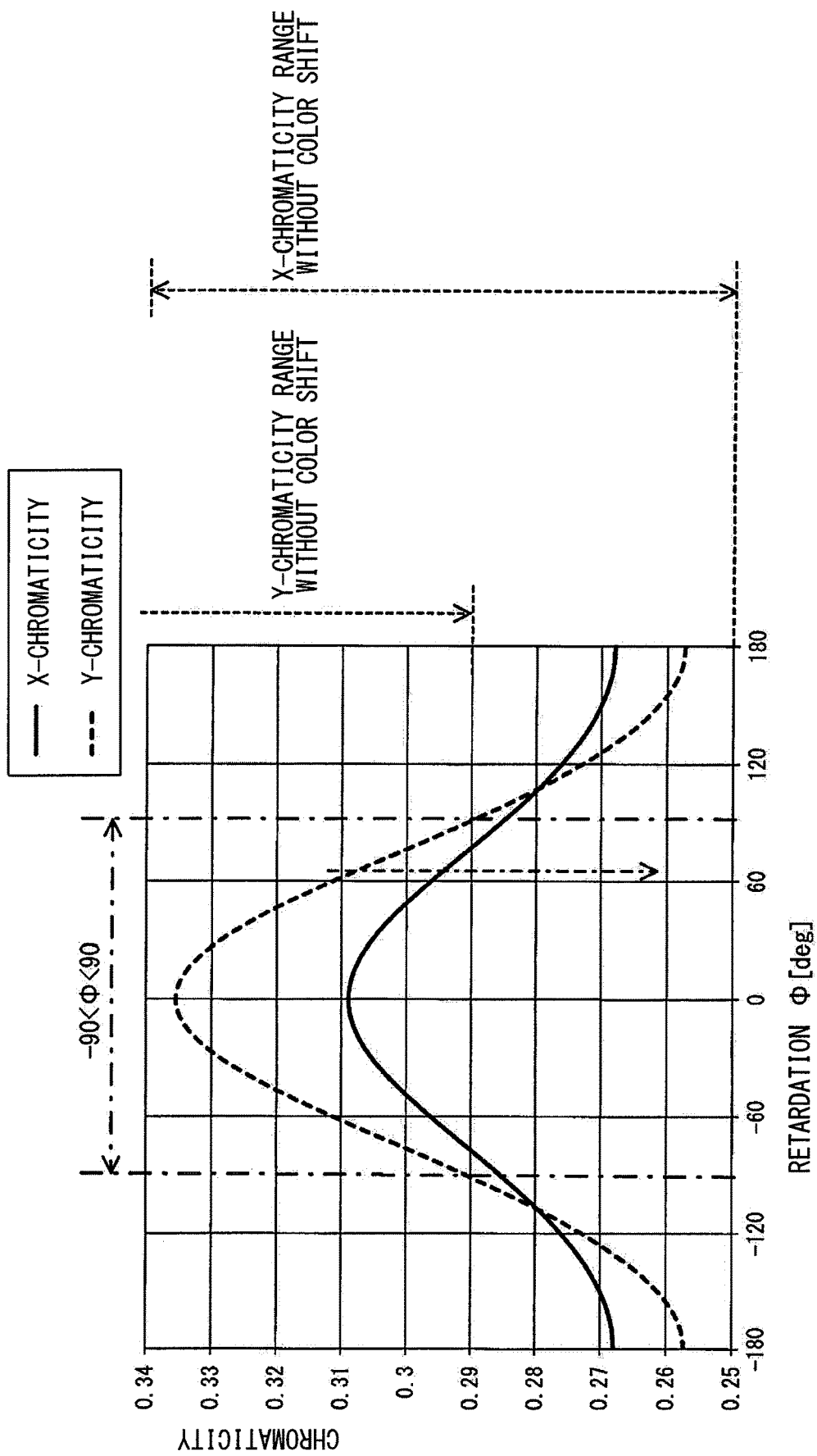
FIG. 6 is a graph for explaining advantageous effects of an embodiment.

That is, this finding is that when the retardation of the subject wavelength in the reflective optical system 34 is in the range greater than −π/2 [rad] (i.e., −90 [deg]) and smaller than π/2 [rad] (i.e., 90 [deg]), both of X chromaticity and Y chromaticity of the source light reflected by the imaging optical system 10 can be limited to a range without causing color shift, as shown in FIG. 6.

The graph shown in FIG. 6 is the result obtained by the inventor's diligent studying, and illustrates a relationship between the retardation of the subject wavelength of the reflective optical system 34 and the X chromaticity and Y chromaticity of the source light projected to the imaging optical system 10. In FIG. 6, the range of the X chromaticity without causing the color shift is defined in a range from 0.25 to 0.35, and the range of the Y chromaticity without causing the color shift is defined in a range from 0.29 to 0.38.

As described hereinabove, the head-up display 1 can suppress the change in chromaticity of the source light projected to the imaging optical system 10.

In other words, the head-up display device 1 can suppress the change in chromaticity of the source light projected to the imaging optical system 10 while reducing damage to the illumination optical system 22 due to the sunlight.

OTHER EMBODIMENTS (1) In the embodiment described hereinabove, the movable body to which the HUD 1 is mounted is an automobile. However, the movable body to which the HUD 1 is mounted is not limited to the automobile. The movable body to which the HUD 1 is mounted may be aircrafts, vehicles, or ships.

(2) In the embodiment described hereinabove, the subject wavelength is in the wavelength range in which the relative intensity of the spectrum of the evaluation spectrum is equal to or greater than the threshold $I_T$ and the rate of the spectrum intensity to the intensity sum of the evaluation spectrum is equal to or greater than the preset value $I_{th}$. However, the subject wavelength is not limited to the above example.

Figure 7:
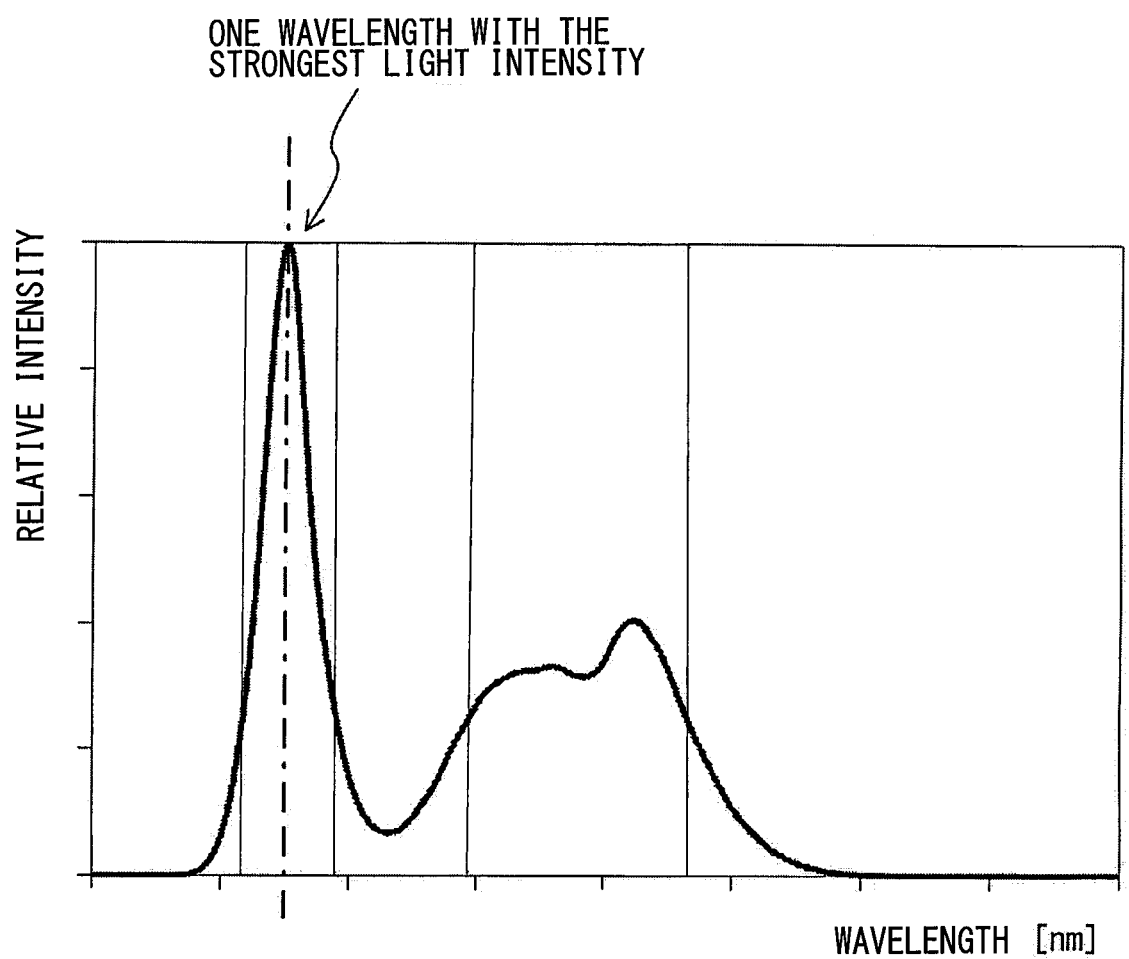
FIG. 7 is a graph for explaining a modification of a subject wavelength.

For example, as shown in FIG. 7, the subject wavelength may be a single wavelength that has a strongest light intensity in the spectrum of the source light from the illumination optical system 22.

Note that the single wavelength is one wavelength that has the strongest light intensity in the spectrum of the source light. In the present disclosure, however, the single wavelength is not limited to one wavelength having the strongest light intensity in the spectrum of the source light, but may include a wavelength range that can be regarded as one wavelength having the strongest light intensity in the spectrum of the source light.

In regard to the spectrum of the source light from the illumination optical system 22, the wavelength range of each of the red, blue and green may be employed as the subject wavelength. In this case, the wavelength in red is in a wavelength range in which a human can visually recognize as red color, and is for example, in a range from 620 [nm] to 750 [nm]. In this case, the wavelength in blue is in a wavelength range in which a human can visually recognize as blue color, and is for example, in a range from 450 [nm] to 495 [nm]. In this case, the wavelength in green is in a wavelength range in which a human can visually recognize as green color, and is for example, in a range from 495 [nm] to 570 [nm].

While the present disclosure has been described in accordance with the above embodiments, it is understood that the present disclosure is not limited to the above embodiments and structures. The present disclosure embraces various changes and modifications within the range of equivalency. In addition, various combinations and modifications and other combinations and modifications including only one element or more or less than one element are within the scope and sprit of the present disclosure.

What is claimed is:

1. A head-up display device that is to be mounted to a movable body, the head-up display device comprising:
    an illumination optical system being configured to emit a source light indicating information disposed in a vehicle;
    an imaging optical system in which the source light emitted by the illumination optical system is projected to a projection surface provided in the vehicle; and
    a reflective optical system disposed in the vehicle
        being arranged on a path of the source light from the illumination optical system to the imaging optical system such that a polarization axis of the source light emitted from the illumination optical system defines an angle relative to an incident surface of the reflective optical system, the angle being greater than 0 degree and smaller than 90 degrees, or being greater than 90 degrees and smaller than 180 degrees,
        wherein the reflective optical system has a dielectric multilayer film that transmits an electromagnetic wave in an infrared region and reflects an electromagnetic wave in a visible light region, and
        wherein the reflective optical system is configured so that a retardation of a subject wavelength including at least a part of wavelengths of the source light emitted by the illumination optical system is in a range greater than $-\pi/2$ [rad] and smaller than $\pi/2$ [rad],
    wherein the movable body is the vehicle.

2. The head-up display device according to claim 1, wherein
    the subject wavelength includes a single wavelength having a strongest light intensity in a spectrum of the source light emitted by the illumination optical system and being incident on the reflective optical system, and
    the reflective optical system is configured so that the retardation of the subject wavelength is in the range greater than $-\pi/2$ [rad] and smaller than $\pi/2$ [rad].

3. The head-up display device according to claim 1, wherein
    the subject wavelength includes wavelength regions of red, blue and green in a spectrum of the source light emitted by the illumination optical system and being incident on the reflective optical system, and
    the reflective optical system is configured so that the retardation of the subject wavelength is in the range greater than $-\pi 2$ [rad] and smaller than $\pi/2$ [rad].

4. The head-up display device according to claim 1, wherein
    the subject wavelength includes a wavelength region that has a rate of a spectrum intensity to an intensity sum being equal to or greater than a preset value, the intensity sum being a sum of spectrum intensities in an evaluation spectrum obtained by multiplying a spectrum of the source light emitted from the illumination optical system by a color-matching function and being incident on the reflective optical system with a matching function, and
    the reflective optical system is configured so that the retardation of the subject wavelength is in the range greater than $-\pi/2$ [rad] and smaller than $\pi/2$ [rad].

5. The head-up display device according to claim 1, further comprising:
    at least one retardation plate that is arranged on the path of the source light from the illumination optical system to the imaging optical system, and provides a retardation to orthogonal polarization components, wherein
    the retardation plate is arranged so that the angle of the polarization axis of the source light emitted by the illumination optical system relative to the incident surface of the reflective optical system is greater than 0 degree and smaller than 90 degrees, or greater than 90 degrees and smaller than 180 degrees.

6. A head-up display device for a vehicle comprising:
    an illumination optical system being configured to emit a source light indicating information disposed in the vehicle;
    an imaging optical system in which the source light emitted by the illumination optical system is projected to a projection surface provided in the vehicle; and
    a reflective optical system disposed in the vehicle
        being arranged on a path of the source light from the illumination optical system to the imaging optical system such that a polarization axis of the source light emitted from the illumination optical system defines an angle relative to an incident surface of the reflective optical system, the angle being greater than 0 degree and smaller than 90 degrees, or being greater than 90 degrees and smaller than 180 degrees,
        wherein the reflective optical system has a dielectric multilayer film that transmits an electromagnetic wave in an infrared region and reflects an electromagnetic wave in a visible light region, and
        wherein the reflective optical system is configured so that a retardation of a subject wavelength including at least a part of wavelengths of the source light emitted by the illumination optical system is in a range greater than $-\pi/2$ [rad] and smaller than $\pi/2$ [rad].

7. The head-up display device according to claim 6, wherein
    the subject wavelength includes a single wavelength having a strongest light intensity in a spectrum of the source light emitted by the illumination optical system and being incident on the reflective optical system, and
    the reflective optical system is configured so that the retardation of the subject wavelength is in the range greater than $-\pi/2$ [rad] and smaller than $\pi/2$ [rad].

8. The head-up display device according to claim 6, wherein the subject wavelength includes wavelength regions of red, blue and green in a spectrum of the source light emitted by the illumination optical system and being incident on the reflective optical system, and the reflective optical system is configured so that the retardation of the subject wavelength is in the range greater than $-\pi/2$ [rad] and smaller than $\pi/2$ [rad].

9. The head-up display device according to claim 6, wherein the subject wavelength includes a wavelength region that has a rate of a spectrum intensity to an intensity sum being equal to or greater than a preset value, the intensity sum being a sum of spectrum intensities in an evaluation spectrum obtained by multiplying a spectrum of the source light emitted from the illumination optical system by a color-matching function and being incident on the reflective optical system with a matching function, and the reflective optical system is configured so that the retardation of the subject wavelength is in the range greater than $-\pi/2$ [rad] and smaller than $\pi/2$ [rad].

10. The head-up display device according to claim 6, further comprising:

at least one retardation plate that is arranged on the path of the source light from the illumination optical system to the imaging optical system, and provides a retardation to orthogonal polarization components, wherein the retardation plate is arranged so that the angle of the polarization axis of the source light emitted by the illumination optical system relative to the incident surface of the reflective optical system is greater than 0 degree and smaller than 90 degrees, or greater than 90 degrees and smaller than 180 degrees.

* * * * *